Patented Apr. 9, 1940

2,196,222

UNITED STATES PATENT OFFICE 2,196,222

AZO COMPOUNDS AND PROCESS FOR COLORING THEREWITH

James G. McNally and Joseph B. Dickey, Rochester, N. Y., assignors to Eastman Kodak Company, Rochester, N. Y., a corporation of New Jersey No Drawing. Application October 26, 1938, Serial No. 237,062

9 Claims. (Cl. 8—50)

This invention relates to new aromatic azo dye compounds and their application to the art of dyeing or coloring.

We have found that valuable azo dye compounds can be prepared by coupling an aromatic diazonium compound with a coupling compound having the general formula:

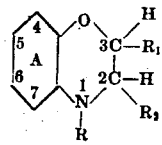

wherein R, $R_1$ and $R_2$ each represents hydrogen, an alkyl group or an aryl group and A means that the benzene nucleus so designated may be substituted. For purposes of reference, the formula for the coupling compounds has been numbered I. Similarly, for purposes of clarity, the coupling compounds have been numbered as indicated in Formula I. The numbering given is that which will be employed throughout.

The azo dye compounds of our invention have the general formula:

$$R_3-N=N-R_4$$

wherein $R_3$ represents the residue of an aromatic nucleus and $R_4$ represents the residue of a coupling compound indicated by the general formula numbered I. Advantageously, $R_3$ is an aryl nucleus of the benzene series.

The nucleus designated A may be substituted with any of the usual substituent groups. It may be substituted, for example, with an alkyl group such as methyl, ethyl, propyl, β-methoxyethyl or β-hydroxyethyl, a nitro group, a hydroxy group, an acetamino group, an alkoxy group such as methoxy or ethoxy, a halogen atom such as chlorine, bromine or iodine or a cyano group. It will be appreciated, however, that the substituents just mentioned are intended to be illustrative and not limitative of the invention.

It will be understood that while the nucleus A of the coupling component numbered I may be substituted, the coupling position must not be blocked. Normally, coupling will occur in the p-position to the nitrogen atom shown and this position ordinarily should be free. No substituent, which would prevent coupling, should be present in the nucleus A.

Both sulfonated and non-sulfonated compounds are included within the scope of our invention. The nuclear non-sulfonated compounds have, however, been found to be particularly of value for the dyeing of organic derivatives of cellulose and it is to these compounds and their application for the dyeing of organic derivatives of cellulose that our invention is particularly directed. These nuclear non-sulfonated compounds likewise possess application for the dyeing of wool and silk. For the dyeing of organic derivatives of cellulose nuclear non-sulfonated dye compounds, wherein $R_3$ is an aryl nucleus of the benzene series are generally advantageous. The nuclear sulfonated compounds of our invention have little or no utility for the dyeing of organic derivatives of cellulose but may be employed for the dyeing of wool and cotton. Orange-yellow, orange, orange-red, red, bluish-red, blue and purple dyeings, for example, may be obtained employing the dye compounds of our invention.

Organic derivatives of cellulose are characterized by an indifferent affinity for the usual cotton and wool dyes, especially the ordinary water soluble dyes. Because of this, it has been necessary to develop new dye compounds suitable for the dyeing or coloration of materials such as textile materials made of or containing an organic derivative of cellulose. It is, accordingly, an object of our invention to provide a new class of azo dyes suitable for the dyeing or coloration of organic derivatives of cellulose.

Another object of our invention is to provide a process for the dyeing or coloration of organic derivatives of cellulose. A further object is to produce dyed textile materials made of or containing an organic derivative of cellulose which are of good fastness to light and washing. Other objects will hereinafter appear.

Typical organic derivatives of cellulose include the hydrolyzed as well as the unhydrolyzed cellulose organic acid esters, such as cellulose acetate, cellulose formate, cellulose propionate or cellulose butyrate, and the hydrolyzed as well as the unhydrolyzed mixed organic acid esters of cellulose, such as cellulose acetate-propionate, cellulose acetate-butyrate, and the cellulose ethers, such as methyl cellulose, ethyl cellulose or benzyl cellulose.

The following examples illustrate the preparation of the azo dye compounds of our invention:

EXAMPLE 1

12.8 grams of o-chloroaniline are added to 150 grams of an ice and water mixture to which has been added 25 cc. of 36% hydrochloric acid and the resulting mixture is diazotized by the addition, with stirring, of 6.9 grams of sodium nitrite dissolved in water. The diazotization reaction is carried out while maintaining a temperature of 0–10° C. throughout.

12.5 grams of phenmorpholine are dissolved in a dilute hydrochloric acid solution and the resulting mixture is cooled to a temperature approximating 0–10° C. The diazonium compound, prepared as described above, is then slowly added with stirring and following its addition the mixture is permitted to stand for a while after which it is slowly made neutral to Congo red paper by the addition of sodium acetate or sodium carbonate. Upon completion of the coupling reaction which takes place, the dye compound formed is recovered by filtration, washed with water and dried. The dye compound obtained has the probable formula:

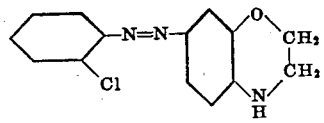

and colors cellulose acetate silk an orange-yellow shade.

EXAMPLE 2

13.5 grams of p-aminoacetophenone are diazotized and the diazonium compound resulting is coupled with 16.3 grams of 1,6-dimethylphenmorpholine:

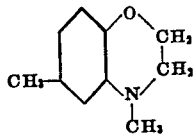

The diazotization and coupling reactions may be carried out in accordance with the procedure described in Example 1. The dye compound obtained colors cellulose acetate silk an orange shade.

EXAMPLE 3

13.8 grams of p-nitroaniline are diazotized in known fashion and the diazonium compound resulting is coupled with 17.9 grams of 1-β-hydroxyethylphenmorpholine having the formula:

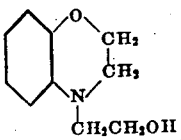

The coupling reaction may be carried out in a cold dilute hydrochloric acid solution in accordance with the method described in Example 1. The dye compound obtained dyes cellulose acetate silk a red shade.

1-γ-hydroxypropylphenmorpholine and 1-glycerylphenmorpholine, for example, may be used in place of 1-β-hydroxyethylphenmorpholine of the example to obtain dye compounds included within the scope of our invention.

EXAMPLE 4

21.7 grams of 1-amino-2-bromo-4-nitrobenzene are diazotized and the diazonium compound obtained is coupled with 32.3 grams of 1-sodium-β-sulfoethyl-4-ethoxyphenmorpholine having the formula:

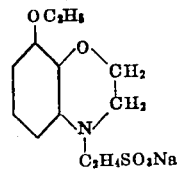

The dye compound obtained colors cellulose acetate silk a rubine shade.

EXAMPLE 5

15 grams of p-aminoacetanilide are diazotized and coupled with 17.9 grams of 1-β-hydroxyethylphenmorpholine. The dye compound formed is recovered and dissolved in ethyl alcohol and then hydrolyzed by adding sodium hydroxide and boiling. The product obtained by this hydrolysis has the formula:

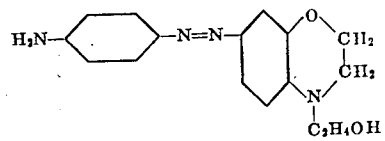

and dyes cellulose acetate an orange-yellow shade. By treating a cellulose acetate fabric dyed with this compound in an acid bath with nitrous acid and coupling the diazo compound thus formed with 2-hydroxy-3-naphthoic acid a blue shade of good light fastness can be obtained. Other phenmorpholine dye compounds having a free diazotizable amino group can be prepared and similarly diazotized and coupled with 2-hydroxy-3-naphthoic acid. Further, another coupling component such as barbituric acid, β-hydroxyethylaniline and 1-phenyl-3-methyl-5-pyrazolone may be employed to obtain varying shades.

EXAMPLE 6

26.2 grams of 1-amino-2,4-dinitro-6-bromobenzene are diazotized in known fashion and the diazonium compound formed is coupled with 19.1 grams of 1-β-methoxyethylphenmorpholine having the formula:

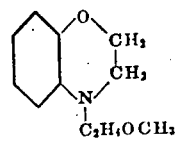

The dye compound obtained dyes cellulose acetate silk a violet shade.

EXAMPLE 7

26.8 grams of 1-amino-4-sulpho-5-nitronaphthalene are diazotized and the diazonium compound obtained is coupled with 14.8 grams of 2-methylphenmorpholine having the formula:

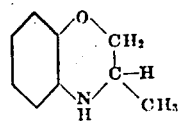

The dye compound obtained colors wool and silk a rubine shade.

The following tabulation further illustrates the compounds included within the scope of our invention together with the color they produce on cellulose acetate silk. The compounds indicated below may be prepared by diazotizing the amines listed under the heading "Amine" and coupling the diazonium compounds obtained with the compounds specified in the column entitled "Coupling component." The diazotization and coupling reactions may, for example, be carried out following the general procedure described in Examples 1-7 inclusive.

| Amine | Coupling component | Color on cellulose acetate silk |
|---|---|---|
| 1-amino-2-hydroxy-4-nitrobenzene | 1-β-hydroxyethyl-7-methoxy-phenmorpholine | Pink-red. |
| 1-amino-2-nitro-4-acetobenzene | 1-glyceryl-6-β-hydroxy-ethoxyphenmorpholine | Rubine. |
| p-Nitroaniline | (1) Phenmorpholine | Red. |
| Do | (2) 1-methylphenmorpholine | Do. |
| Do | (3) 2-methyl-5-chlorphenmorpholine | Do. |
| Do | (4) 1,2-dimethylphenmorpholine | Orange-red. |
| Do | (5) 2-ethylphenmorpholine | Red. |
| Do | (6) 1-ethyl-6-methoxyphenmorpholine | Do. |
| Do | (7) 6-chlorophenmorpholine | Do. |
| Do | (8) 6-cyanophenmorpholine | Orange-red. |
| Do | (9) 3-methylphenmorpholine | Do. |
| Do | (10) 2-phenylphenmorpholine | Red. |
| p-Aminoacetophenone | 1-10 | Do. |
| 1-amino-2,4,6-trinitrobenzene | 1-10 | Orange. |
| 1-aminobenzothiazole | 1-10 | Rubine to blue. |
| 1-amino-2-methoxy-4-nitrobenzene | 1-10 | Orange to rubine. |
| 1-amino-4-nitronaphthalene | 1-10 | Do. |
| 2,4-dinitroaniline | 1-10 | Red to rubine. |
| p-Aminoazobenzene | 1-10 | Rubine to red-blue. |
| | | Orange to rubine. |

In order that the preparation of the azo dye compounds of our invention may be clearly understood, the preparation of certain intermediate compounds which can be employed in their manufacture is indicated hereinafter.

*Preparation of phenmorpholine*

This compound may be prepared as described in Berichte der Deutschen Chemischen Gesellschaft, vol 22, pages 2095 and 2096.

*Preparation of 1-methylphenmorpholine*

This compound may be prepared as described in Berichte der Deutschen Chemischen Gesellschaft, vol. 22, pages 2097 and 2098.

*Preparation of 2-methylphenmorpholine*

This compound may be prepared as described in Berichte der Deutschen Chemischen Gesellschaft, vol. 30, pages 1635 and 1636.

*Preparation of nitro-2-methylphenmorpholine*

This compound may be prepared as described in Berichte der Deutschen Chemischen Gesellschaft, vol. 30, page 1639. The corresponding amino-2-methylphenmorpholine compound can likewise be prepared as described on pages 1639 and 1640 of the Berichte volume just referred to.

*Preparation of 2-methyl-5-chlorphenmorpholine*

This compound may be prepared as described in Berichte der Deutschen Chemischen Gesellschaft, vol. 31, pages 754 and 758.

Substituents may be introduced into the benzene nucleus designated A (see formula numbered I) by methods customary for the introduction of the substituent desired to be introduced into a benzene nucleus by the treatment of phenmorpholine. The introduction of certain substituent groups is shown in connection with the preparation of the specific intermediate compounds just given. Compounds having a hydroxyalkyl group in the 1-position of the phenmorpholine nucleus can be prepared by heating phenmorpholine or a suitably substituted phenmorpholine with an alkylene oxide such as ethylene oxide or propylene oxide or with a chlorohydrin such as ethylene or glyceryl chlorohydrin. 1-β-hydroxyethylphenmorpholine, for example, can be prepared by heating phenmorpholine with ethylene oxide.

The azo dye compounds of our invention are, for the most part, relatively insoluble in water. Those compounds which are insoluble in water may be advantageously employed for the direct dyeing of textile materials by grinding the dye to a fine powder, intimately mixing it with a suitable dispersing or solubilizing agent, and adding the resulting mixture to water or a dilute solution of soap in water to form an aqueous dyebath. Following this known preparation of the dyebath, the textile materials to be dyed may be added to the dyebath and the dyeing operation conducted in known fashion. The dye compounds of our invention which are water soluble do not, of course, require the use of a dispersing or solubilizing agent but may be applied to silk, wool and (depending upon the nature and position of the water-solubilizing group) organic derivatives of cellulose textile materials from an aqueous solution of the dye which may contain salt. For a more complete description as to how the azo dye compounds of our invention may be employed in dyeing or coloring operations, reference may be had to our U. S. Letters Patent No. 2,115,030, issued April 26, 1938. For a more detailed description as to how the water soluble azo dyes of our invention may be employed for the coloration of textile materials made of or containing organic derivatives of cellulose, silk and wool or mixtures of these, reference may be had to our U. S. Letters Patent No. 2,107,898, issued February 8, 1938.

We claim:

1. Material made of or containing an organic derivative of cellulose colored with a nuclear non-sulfonated azo dye compound having the general formula:

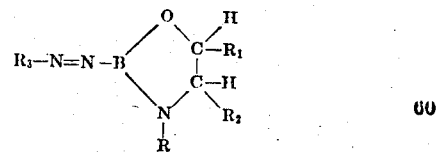

wherein $R_3$ represents the residue of an aromatic nucleus, B represents the residue of an aryl nucleus of the benzene series containing but one benzene nucleus and wherein the oxygen atom and the nitrogen atom shown are attached to said aryl nucleus B in meta and para position, respectively, to the azo bond and wherein R, $R_1$ and $R_2$ each represents a member selected from the group consisting of hydrogen, an alkyl group and an aryl group.

2. Material made of or containing an organic derivative of cellulose colored with a nuclear non-sulfonated monoazo dye compound having the general formula:

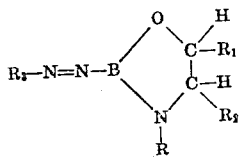

wherein $R_3$ represents the residue of an aryl nucleus of the benzene series containing but one benzene nucleus, B represents the residue of an aryl nucleus of the benzene series containing but one benzene nucleus and wherein the oxygen atom and the nitrogen atom shown are attached to said aryl nucleus B in meta and para position, respectively, to the azo bond and wherein R, $R_1$ and $R_2$ each represents a member selected from the group consisting of hydrogen, an alkyl group and an aryl group.

3. Material made of or containing an organic acid ester of cellulose colored with a nuclear non-sulfonated azo dye compound having the general formula:

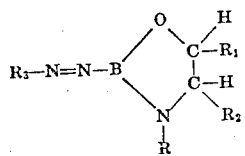

wherein $R_3$ represents the residue of an aryl nucleus of the benzene series containing but one benzene nucleus, B represents the residue of an aryl nucleus of the benzene series containing but one benzene nucleus and wherein the oxygen atom and the nitrogen atom shown are attached to said aryl nucleus B in meta and para position, respectively, to the azo bond and wherein R, $R_1$ and $R_2$ each represents a member selected from the group consisting of hydrogen, an alkyl group and an aryl group.

4. A cellulose acetate colored with a nuclear non-sulfonated monoazo dye compound having the general formula:

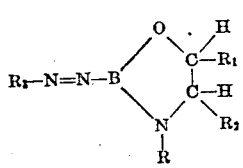

wherein $R_3$ represents the residue of an aromatic nucleus, B represents the residue of an aryl nucleus of the benzene series containing but one benzene nucleus and wherein the oxygen atom and the nitrogen atom shown are attached to said aryl nucleus B in meta and para position, respectively, to the azo bond and wherein R, $R_1$ and $R_2$ each represents a member selected from the group consisting of hydrogen, an alkyl group and an aryl group.

5. A cellulose acetate colored with a nuclear non-sulfonated monoazo dye compound having the general formula:

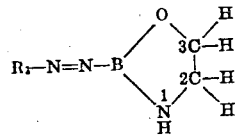

wherein $R_3$ represents the residue of an aryl nucleus of the benzene series containing but one benzene nucleus, B represents the residue of an aryl nucleus of the benzene series containing but one benzene nucleus and wherein the oxygen atom and the nitrogen atom shown are attached to said aryl nucleus B in meta and para position, respectively, to the azo bond and wherein the hydrogen atom in the 1-position and one of the hydrogen atoms in each of the 2 and 3 positions may be replaced with an alkyl group.

6. The process of coloring material made of or containing an organic derivative of cellulose which comprises applying thereto a nuclear non-sulfonated azo dye compound having the general formula:

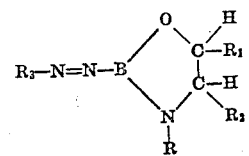

wherein $R_3$ represents the residue of an aromatic nucleus, B represents the residue of an aryl nucleus of the benzene series containing but one benzene nucleus and wherein the oxygen atom and the nitrogen atom shown are attached to said aryl nucleus B in meta and para position, respectively, to the azo bond and wherein R, $R_1$ and $R_2$ each represents a member selected from the group consisting of hydrogen, an alkyl group and an aryl group.

7. The process of coloring material made of or containing an organic derivative of cellulose which comprises applying thereto a nuclear non-sulfonated monoazo dye compound having the general formula:

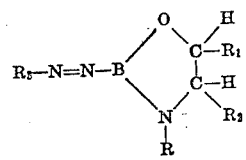

wherein $R_3$ represents the residue of an aryl nucleus of the benzene series containing but one benzene nucleus, B represents the residue of an aryl nucleus of the benzene series containing but one benzene nucleus and wherein the oxygen atom and the nitrogen atom shown are attached to said aryl nucleus B in meta and para position, respectively, to the azo bond and wherein R, $R_1$ and $R_2$ each represents a member selected from the group consisting of hydrogen, an alkyl group and an aryl group.

8. The process of coloring a cellulose acetate which comprises applying thereto a nuclear non-sulfonated monoazo dye compound having the general formula:

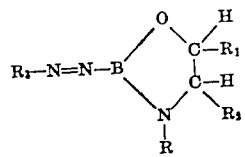

wherein $R_3$ represents the residue of an aryl nucleus of the benzene series containing but one benzene nucleus, B represents the residue of an aryl nucleus of the benzene series containing but one benzene nucleus and wherein the oxygen atom and the nitrogen atom shown are attached to said aryl nucleus B in meta and para position, respectively, to the azo bond and wherein R, $R_1$ and $R_2$ each represents a member selected from the group consisting of hydrogen, an alkyl group and an aryl group.

9. The process of coloring a cellulose acetate which comprises applying thereto a nuclear non-sulfonated monoazo dye compound having the general formula:

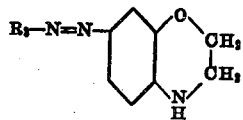

wherein $R_3$ represents the residue of an aryl nucleus of the benzene series.

JAMES G. McNALLY.
JOSEPH B. DICKEY.